March 13, 1956 — M. L. SMALLEGAN — 2,737,823
CHAIN SHOES
Filed Aug. 21, 1953
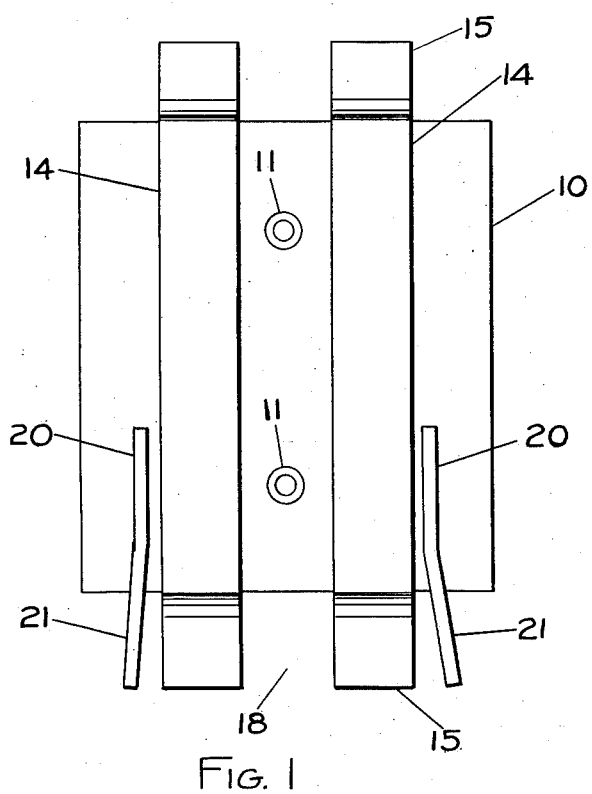
Fig. 1
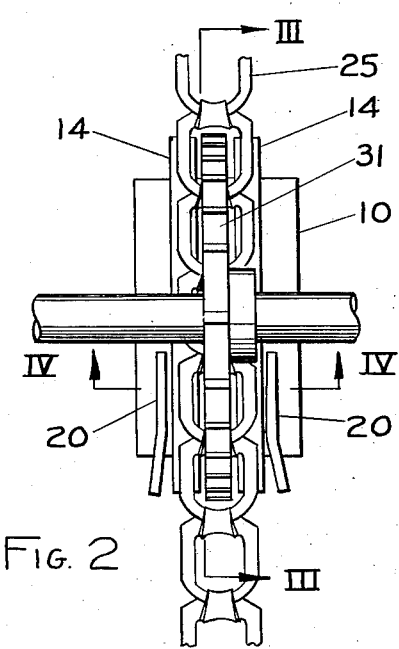
Fig. 2
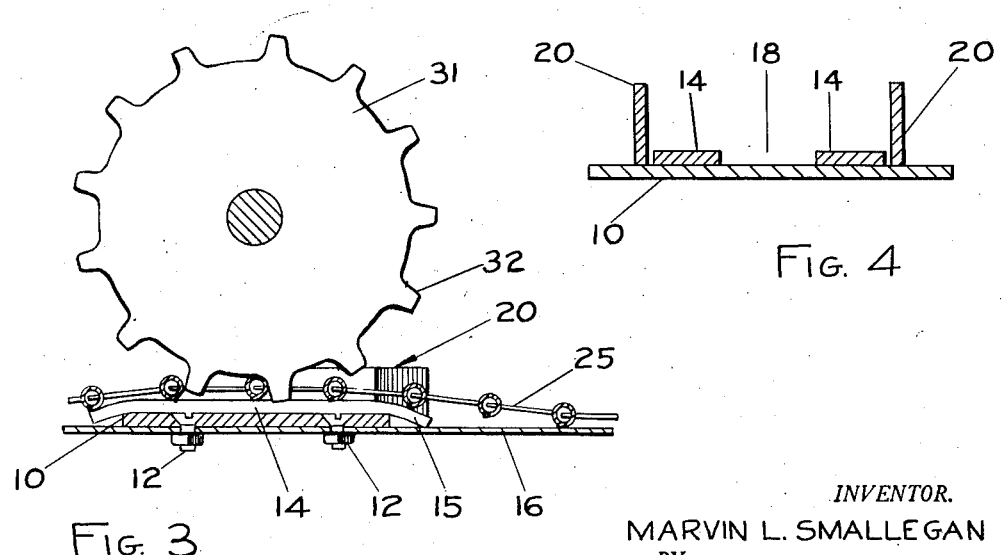
Fig. 3
Fig. 4
INVENTOR.
MARVIN L. SMALLEGAN
BY Peter P. Price
ATTORNEY

United States Patent Office 2,737,823
Patented Mar. 13, 1956

2,737,823

CHAIN SHOES

Marvin L. Smallegan, Zeeland, Mich., assignor to Automatic Poultry Feeder Company, Zeeland, Mich., a corporation of Michigan Application August 21, 1953, Serial No. 375,678

3 Claims. (Cl. 74—240)

This application relates to chain shoes and more particularly to an improved shoe for guiding a chain and supporting it in positive contact with a sprocket operating as the driving means of the chain. The invention is particularly designed for use with flat chains in which the chain does not pass around the sprocket but merely tangentally contacts the sprocket at one point.

This application is a continuation-in-part of my copending application entitled Poultry Feed Hopper Construction, Serial No. 233,302, filed June 25, 1951.

The problem in this type of structure is to provide means permitting the teeth of the sprocket to penetrate the chain sufficiently to securely grip the chain without interference with the surface upon which the chain is riding. Where the chain is carrying some type of granular or comminuted material, the chain should not be raised any higher than it is necessary to effect this purpose. The shoe must provide a positive guide for the chain to assure proper alignment between the chain and sprocket at all times.

My invention provides a positive guide for the chain, raising it only enough to assure full engagement between the chain and the sprocket. At the same time it provides a channel within which the ends of the sprocket teeth may travel at the lowest point while engaged with the chain. This is accomplished in a structure which is simple to construct and adapted to function satisfactorily over long periods without replacement or maintenance.

These and other objects and purposes of my invention will be immediately seen by those acquainted with the design and constrtucion of automatic poultry feeding equipment employing a chain distribution system upon reading the following specification and the accompanying drawings.

In the drawings:

Fig. 1 is a plan view of my improved chain shoe.

Fig. 2 is a plan view, on a reduced scale, of my improved chain shoe showing it in operational relationship with the chain and sprocket.

Fig. 3 is a sectional, elevation view taken along the line III—III of Fig. 2.

Fig. 4 is a sectional, elevation view taken along the plane IV—IV of Fig. 2 showing the shoe only.

In executing the objects and purposes of my invention, I have provided an improved chain shoe consisting of a base plate upon which are mounted a pair of spaced, chain supporting runners. On each end, the runners are sloped downwardly to facilitate the entrance and discharge of the chain from the shoe. At the entrance end, the shoe is provided with a pair of spaced guides to control the lateral position of the chain as it passes through the shoe.

Referring specifically to the drawings, the numeral 10 indicates a base plate. The base plate 10, along its longitudinal center line, has a pair of countersunk holes 11 (Fig. 1) for the screws 12 (Fig. 3) by which the plate is secured to the structure forming the floor surface 16 along which the hereinafter described chain moves. Equidistant from the center line of the base plate and on each side thereof is a track member or runner 14. The spacing of the runners creates a sprocket channel 18. The runners 14 are parallel. On each end they are bent downwardly to provide inclined ramps 15. The inclination of the ramps 15 is such that the runners 14 slope downwardly to contact or almost contact the surface of the floor structure 16 upon which the shoe is mounted. The runners 14 are narrow, their combined width being substantially less than the total width of the chain 25.

Outwardly of each of the runners 14 is an upstanding chain guide 20. The chain guides 20 project substantially beyond the end of the base plate 10 to, or almost to, the ends of the runners 14. The outwardly extending portions 21 of the chain guides 20 are flared away from the runners to provide a converging passageway at the end of the shoe at which the chain 25 enters. The chain guides 20 extend along the runners only a short portion of the runners' length and are placed only at the entrance end of the shoe. They are rigidly secured to the base plate 10 by welding. Likewise, the runners 14 are secured to the plate 10 by welding. It will be recognized that they may be detachably secured by screws where the use is such that it is necessary to frequently change them because of excessive wear.

The various parts of my improved chain shoe are fabricated from steel or other suitable, durable, wear-resisting material.

*Operation*

The shoe is securely mounted to the floor structure 16 in alignment with the chain 25 with the runners 14 centered beneath the chain 25 to raise it and support it above the floor structure 16. The shoe is so located that the runners 14 are equally spaced on each side of the sprocket 31. The spacing between the runners 14 must be such that the sprocket 31 may pass easily between them without contact.

The teeth 32 of the sprocket 31 pass entirely through the chain. Preferably, however, they do not project below the chain or if they do this projection is slight. This arrangement assures positive engagement between the sprocket and the chain without any danger of binding between the chain and the sprocket as the teeth enter and leave the chain. Further, this leaves the area in the sprocket channel 18 free for the movement of any material such as poultry feed being transported by the chain 25.

The thickness of the runners 14 is such that the teeth 32 of the sprocket 31 may pass through the chain and firmly engage it without contact with the plate 10. The chain in effect is raised into engagement with the sprocket 31. Thus, there can be no slipping of the chain. All wear on the teeth 32 and the chain 25 due to improper engagement between these parts is eliminated. The chain guides 20 assure proper lateral alignment between the chain and the sprocket, preventing jamming and excessive wear.

It is thus seen that my invention provides a durable and effective means of providing positive, tangental engagement between a chain and a driving sprocket by a relatively simple and inexpensive device.

Having described the structure and operation of my improved chain shoe what I claim to be my invention is set forth in the following appended claims.

I claim:

1. In combination with a flat chain and a driving sprocket having teeth passing through said chain: a flat base plate; a pair of parallel runners rigidly mounted to the top surface of said base plate; said runners defining a sprocket channel therebetween; said chain passing over a shoe and resting upon said runners; the ends of said runners projecting beyond each end of said base plate; said ends being downwardly inclined to form ascending and descending ramps for said chain; the teeth of said sprocket passing through said chain and the ends thereof being received in upper portion of said sprocket channel; a pair of upstanding guide members rigidly mounted to said base plate, one adjacent each of said runners, one of said guide members being on each side of said chain.

2. In combination with a chain and a driving sprocket having teeth passing through said chain: a base member; a pair of parallel runners rigidly mounted to the top surface of said base member; said runners defining a sprocket channel therebetween; said runners adapted to support said chain; the teeth of said sprocket passing through said chain and the ends thereof being received in the upper portion of said sprocket channel.

3. In combination with a chain and a driving sprocket having teeth passing through said chain: a flat base member; a pair of parallel runners rigidly mounted to the top surface of said base member; said runners defining a sprocket channel therebetween; said runners adapted to support said chain; the teeth of said sprocket passing through said chain and the ends thereof being received in the upper portion of said sprocket channel; a pair of upstanding guide members rigidly mounted to said base member, one adjacent each of said runners, one of said guide members being on each side of said chain.

References Cited in the file of this patent

UNITED STATES PATENTS

| | | |
|---|---|---|
| 414,774 | Merrell | Nov. 12, 1889 |
| 2,502,564 | Hansson | Apr. 4, 1950 |

FOREIGN PATENTS

| | | |
|---|---|---|
| 346,909 | Great Britain | Apr. 23, 1931 |